United States Patent
Forst et al.

(10) Patent No.: US 12,119,955 B2
(45) Date of Patent: Oct. 15, 2024

(54) METHOD FOR OPERATING A DOMESTIC APPLIANCE, COMPUTER PROGRAM PRODUCT AND ARRANGEMENT COMPRISING A DOMESTIC APPLIANCE AND AN EXTERNAL OPERATING DEVICE

(71) Applicant: BSH Hausgeräte GmbH, Munich (DE)

(72) Inventors: Klaus-Martin Forst, Dillingen (DE); Sebastian Wagner, Glött (DE)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 17/792,422

(22) PCT Filed: Jan. 21, 2021

(86) PCT No.: PCT/EP2021/051267
§ 371 (c)(1),
(2) Date: Jul. 13, 2022

(87) PCT Pub. No.: WO2021/156064
PCT Pub. Date: Aug. 12, 2021

(65) Prior Publication Data
US 2023/0055413 A1  Feb. 23, 2023

(30) Foreign Application Priority Data
Feb. 3, 2020 (DE) .......................... 102020201287.3

(51) Int. Cl.
*H04L 12/28* (2006.01)
*G08C 17/02* (2006.01)

(52) U.S. Cl.
CPC .......... *H04L 12/2807* (2013.01); *G08C 17/02* (2013.01); *G08C 2201/12* (2013.01)

(58) Field of Classification Search
CPC . H04L 12/2807; G08C 17/02; G08C 2201/12; G08C 17/00
See application file for complete search history.

(56) References Cited

U.S. PATENT DOCUMENTS

2005/0199783 A1* 9/2005 Wenstrand ............. G06V 40/19
                                                        250/214.1
2005/0212652 A1   9/2005 Ludenia
                          (Continued)

FOREIGN PATENT DOCUMENTS

| CN | 101141336 A | 3/2008 |
| CN | 102637000 A | 8/2012 |

(Continued)

OTHER PUBLICATIONS

National Search Report CN 2021800124163 dated May 22, 2023.
(Continued)

*Primary Examiner* — Suraj M Joshi
*Assistant Examiner* — Jaren Means
(74) *Attorney, Agent, or Firm* — Michael E. Tschupp; Andre Pallapies; Brandon G. Braun

(57) ABSTRACT

In a method for operating a household appliance, a communications connection is established between an external operating facility and the household appliance. An application is executed on the external operating facility and configured so as to receive data from and/or to transmit data to the household appliance via the communications connection. An interaction of a user with the application of the external operating facility is detected and the communications connection between the external operating facility and the household appliance is terminated in dependence upon an expiration of a predetermined time interval since a last detected interaction of the user with the application of the external operating facility.

12 Claims, 3 Drawing Sheets

(56) References Cited

U.S. PATENT DOCUMENTS

| | | | |
|---|---|---|---|
| 2006/0167985 A1* | 7/2006 | Albanese | H04L 67/1063 709/203 |
| 2008/0188963 A1* | 8/2008 | McCoy | H04L 12/2827 714/E11.202 |
| 2011/0057518 A1* | 3/2011 | Gilbert | G08C 17/02 307/112 |
| 2013/0007668 A1* | 1/2013 | Liu | G06F 3/012 715/841 |
| 2014/0125575 A1 | 5/2014 | Samanta Singhar | |
| 2015/0036573 A1 | 2/2015 | Malik | |
| 2015/0127712 A1* | 5/2015 | Fadell | H04L 12/2807 709/202 |
| 2015/0269943 A1 | 9/2015 | Vanblon | |
| 2016/0299675 A1 | 10/2016 | Winde | |
| 2019/0334800 A1 | 10/2019 | Sotriffer | |

FOREIGN PATENT DOCUMENTS

| | | |
|---|---|---|
| CN | 103926890 A | 7/2014 |
| CN | 104035648 A | 9/2014 |
| CN | 105869374 A | 8/2016 |
| CN | 106292610 A | 1/2017 |
| CN | 106358190 A | 1/2017 |
| CN | 106452515 A | 2/2017 |
| CN | 107733994 A | 2/2018 |
| CN | 109218150 A1 | 1/2019 |
| CN | 109905302 A | 6/2019 |
| CN | 110716439 A | 1/2020 |
| DE | 102014214836 A1 | 2/2016 |

OTHER PUBLICATIONS

National Search Report DE 10 2020 201 287.3 dated Sep. 21, 2021.
International Search Report PCT/EP2021/051267 dated Apr. 19, 2021.

* cited by examiner

METHOD FOR OPERATING A DOMESTIC APPLIANCE, COMPUTER PROGRAM PRODUCT AND ARRANGEMENT COMPRISING A DOMESTIC APPLIANCE AND AN EXTERNAL OPERATING DEVICE

CROSS-REFERENCES TO RELATED APPLICATIONS

This application is the U.S. National Stage of International Application No. PCT/EP2021/051267, filed Jan. 21, 2021, which designated the United States and has been published as International Publication No. WO 2021/156064 A1 and which claims the priority of German Patent Application, Serial No. 10 2020 201 287.3, filed Feb. 3, 2020, pursuant to 35 U.S.C. 119(a)-(d).

The contents of International Application No. PCT/EP2021/051267 and German Patent Application, Serial No. 10 2020 201 287.3 are incorporated herein by reference in their entireties as if fully set forth herein.

BACKGROUND OF THE INVENTION

The present invention relates to a method for operating a household appliance, a computer program product and an arrangement comprising a household appliance and an external operating facility.

Connectable household appliances are known and said connectable household appliances can communicate via a network with other devices, for example with a mobile device of the user. In this case, for example status data of the household appliance, such as a fill level of a consumable, is transmitted to the mobile device so as to inform the user. Such a functionality is particularly comfortable for users of the household appliance. However, the components of the household appliance that are responsible for the communications connection consume a lot of energy as long as an active communications connection exists with the mobile device, even if data is not currently being transmitted. Furthermore, the active communications connection prevents the household appliance going into a standby mode. It is desired for energy saving reasons to terminate functions that are not currently being used and to switch off the corresponding components.

The publication DE 10 236 937 A1 describes a household appliance that has a motion detector. Different device functions of the household appliance are switched on or switched off in dependence upon a signal of the motion detector in order to save energy.

BRIEF SUMMARY OF THE INVENTION

Against this background, an object of the present invention resides in proposing an improved method for operating a household appliance.

In accordance with a first aspect, a method for operating a household appliance is proposed, preferably a water-conducting household appliance that can be coupled to an external operating facility by means of a communications connection. In a first step a), the communications connection is produced between the external operating facility and the household appliance. In a second step b), an application is executed on the external operating facility that is configured so as to receive data from and/or to transmit data to the household appliance by means of the communications connection. In a third step c), an interaction of a user with the application of the external operating facility is detected. In a fourth step d), the communications connection between the external operating facility and the household appliance is terminated in dependence upon an expiration of a predetermined time interval since a last detected interaction of the user with the application of the external operating facility.

This method has the advantage that on the one hand, the communications connection is terminated in order to save energy if the user does not show interest in said communications connection for the predetermined time interval, and on the other hand it is rendered particularly simple to maintain the communications connection to the user by means of an interaction with the application.

The household appliance is for example a water-conducting household appliance such as a dishwasher or a washing machine, a cooking appliance such as a microwave, a steam cooking appliance, an oven or a hob, or a cooling appliance, such as a fridge or a freezer. The household appliance can also be referred to as a smart home appliance or an IoT appliance (internet of things). The external operating facility is preferably a mobile device such as a mobile telephone, a smartphone or a tablet computer, said external operating facility can however also be provided as a computer or a server.

The communications connection between the household appliance and the external operating facility is preferably a wireless communications connection, such as for example Bluetooth®, Wi-Fi, mobile communications (GSM, 3G, LTE, 5G) or the like. In this case, the communications connection can also extend over multiple networks, for example the household appliance is logged into a Wi-Fi network of the user, wherein a router provides an internet connection, wherein a mobile communications connection is produced via the internet to the external operating facility. Corresponding to this example, different third devices can function so as to provide the communications connection between the household appliance and the external operating facility. The communications connection is preferably encrypted with the result that data that is exchanged between the household appliance and the external operating facility cannot be seen by third parties. The household appliance has a corresponding communications unit, for example a modem so as to establish the communications connection.

The production of the communications connection can be triggered both by the external operating facility as well as by the household appliance.

The application that is executed on the external operating facility is for example an application that is provided by the manufacturer of the household appliance and said application is configured so as to monitor, configure, control or the like the household appliance. For example, it is possible using the application to monitor current consumption values, fill levels of consumables, a current operating state, a malfunction and the like. Furthermore, it can be provided to configure and/or to control the household appliance by means of the application, in other words for example to select and to start a treatment program from a plurality of treatment programs. Advantageously, it is possible using the application to perform a troubleshooting procedure or a check of the function of the household appliance.

It is to be noted that the application can also be executed independently of the communications connection, wherein then for example only historical data of the household appliance, which is stored in the application, is available. It is preferred that the communications connection is automatically produced when starting the application on the external operating facility with the result that current data of the household appliance is available. It can however also be provided that the communications connection is only produced in response to a specific input by the user.

The detection of the interaction of the user with the application of the external operating facility comprises an operation of the application, for example via an input apparatus, wherein in this case it is not mandatory that an exchange of data must take place with the household appliance but rather a navigation in the application or a retrieval of historical data of the household appliance, which is stored in the application, are sufficient. It is preferred that the detection of the interaction of the user with the application also includes non-physical interactions. For example, the user views a display of the external operating facility, and the application displays different current data of the household appliance on said display. Although an input is not performed here on the external operating facility, the attention of the user is focused on the application, which in the present case is understood as an interaction of the user with the application.

The detection of the interaction of the user with the application is preferably carried out by means of sensors included in the external operating facility. Examples of this are an input apparatus, such as a touch sensitive display, mechanical operating elements, a microphone or the like. Furthermore, an image capturing facility, an acceleration sensor, a movement sensor a brightness sensor, a magnetic field sensor and the like are provided. The image capturing facility preferably has a broadened spectral range.

Examples of the detection of an interaction of the user with the application of the external operating facility are a detection of an input by means of an input apparatus of the external operating facility, a detection of a movement of the external operating facility, in particular if this operating facility is provided as a mobile device, a detection of a movement in a region in front of the external operating facility, a detection of a noise in the proximity of the external operating facility, and/or a detection of a combination of multiple of these interactions. It is preferred that multiple such signals that are detected by the sensors of the external operating facility can be taken into consideration and evaluated jointly in order to determine whether it is an interaction of the user with the application. It is thereby possible to avoid an erroneous detection of an interaction.

It is preferred that an interaction of the user with the application of the external operating facility is detected under the condition that the application is active and is executed in the foreground. In the case of external operating facilities that support multitasking, the application in this case can be one of multiple different applications that are active and executed in the foreground.

If an interaction of the user with the application has not been detected for a predetermined time interval, then the communications connection is terminated. It is preferred that this is triggered by the application of the external operating facility. Resources are preserved by terminating the communications connection both in the external operating facility as well as also in the household appliance since for example a modem can be switched off. Moreover, further energy savings are provided in the case of third devices if the communications connection has been provided via third devices.

The method has the advantage that the user can actively maintain the communications connection in a simple manner, preferably without physical interaction with the application. This in particular facilitates a remote monitoring of a household appliance. Furthermore, the method ensures that the communications connection is terminated after a predetermined time interval even if the user for example has forgotten to manually terminate this communications connection or to close the application.

In accordance with one embodiment of the method, the step d) additionally comprises placing the household appliance into an energy saving mode in which an energy consumption of the household appliance is below a predetermined upper limit.

The energy saving mode can be for example a standby mode. This embodiment is particularly advantageous since the household appliance has a minimum energy consumption in the energy saving mode. At the point in time of the placement of the household appliance into the energy saving mode an active communications connection is consequently likewise terminated.

The household appliance is then only placed into the energy saving mode if the household appliance is not operated at the point in time in another active operating program. The term an "active operating program" is understood to mean for example a treatment program such as a washing program in the case of a dishwasher or a washing program in the case of a washing machine.

In the energy saving mode, the household appliance preferably has a functionality that renders it possible to wake the household appliance from the energy saving mode such as for example Wake-on-LAN. Consequently, it is possible to produce a communications connection at any time.

In accordance with a further embodiment of the method, the household appliance is placed into the energy saving mode in dependence upon a command that is transmitted by the application of the external operating facility to the household appliance.

Advantageously, the application of the external operating facility therefore controls whether or not the household appliance is placed into the energy saving mode. For example, the application transmits the corresponding command if the predetermined time interval has expired since the last detected interaction of the user with the application.

As an alternative to this, it can be provided that the household appliance places itself into the energy saving mode if the predetermined time interval has expired since the last detected interaction of the user with the application. For example, for this purpose a stopwatch is provided that is reset in the case of each detected interaction.

In accordance with a further embodiment of the method, the energy consumption of the household appliance in the energy saving mode is at most 2 Watts.

In accordance with a further embodiment of the method, the step c) comprises a detection of eye contact of the user with the application of the external operating facility.

The eye contact is determined by the application for example in dependence upon an image of the surrounding area of the external operating facility and said image is captured by means of an image capturing facility. The term "eye contact" is for example understood to mean that the eyes of the user are directed at a display of the external operating facility. In this case, a distance of the user from the external operating facility can also be taken into consideration.

The eye contact can be detected for example by means of eye recognition, a facial recognition and the like.

This embodiment is particularly advantageous since it is possible in a simple manner for the user to perform an interaction with the application that prevents the communications connection being terminated or even prevents the household appliance being placed into the energy saving mode. It is therefore easy for the user to avoid having to again rebuild the connection, which takes time.

In accordance with a further embodiment of the method, the predetermined time interval comprises at most 15 minutes.

The predetermined time interval can also be shorter. It is preferred that the user can arbitrarily set the predetermined time interval to a preferred value in the range of 0-15 minutes.

In accordance with a further embodiment of the method, this method comprises as a further step waking the household appliance from an energy saving mode so as to produce the communications connection and placing the household appliance into a data query mode in which exclusively the components of the household appliance that are required for the transmission and/or receiving of data by the application are activated.

This embodiment is advantageous since components that are not necessary for the communications connection are not connected and therefore do not consume any energy. Examples for this are a display apparatus that is arranged on the household appliance or also a control apparatus of the household appliance.

In accordance with a further embodiment of the method, this method comprises transmitting a push notification from the household appliance to the application of the external operating facility.

The push notification comprises for example updated data relating to the household appliance.

The push notification is preferably only then transmitted if an active communications connection is provided. This embodiment is advantageous since in this case it is not necessary for the application of the external operating facility to constantly transmit a query to the household appliance in order to obtain current data but rather the household appliance transmits this data itself.

In accordance with a further embodiment of the method, the push notification is periodically transmitted or is transmitted in the case of a change of a state of the household appliance.

The state-dependent transmission of the push notification is advantageous since only then if the state changes is it necessary to transmit data.

In accordance with a second aspect, a computer program product is proposed comprising commands that in the case of the execution of the program by a computer trigger this computer to implement the method in accordance with the first aspect.

A computer program product, such as for example a computer program means, can be provided or delivered as a storage medium, such as for example memory card, USB stick, CD-ROM, DVD or also in the form of a downloadable file from a server in a network. This can be provided for example in a wireless communications network by the transmission of a corresponding file with the computer program product or the computer program means.

In accordance with a third aspect, an arrangement comprising a household appliance and an external operating facility is proposed. The household appliance and the external operating facility can be coupled by means of a communications connection. An application can be executed on the external operating facility and said application is configured so as to receive data from and/or to transmit data to the household appliance by means of the communications connection. The external operating facility is configured during the execution of the application so as to detect an interaction of a user with the application of the external operating facility. The application of the external operating facility is configured so as to terminate the communications connection between the external operating facility and the household appliance in dependence upon an expiration of a predetermined time interval since a last detected interaction of the user with the application of the external operating facility.

The arrangement of the household appliance and the external operating facility is preferably operated by means of the method in accordance with the first aspect. The arrangement has the same advantages as the method. The embodiments of the method apply accordingly for the arrangement.

The external operating facility is preferably a mobile device, such as for example a mobile telephone, a smartphone or a tablet computer, however said external operating facility can also be provided as a computer or server. The household appliance is for example a water-conducting household appliance, such as a dishwasher or a washing machine, a cooking appliance, such as a microwave, a steam cooking appliance, an oven or a hob, or a cooling appliance, such as a fridge or a freezer. The household appliance can also be referred to as a smart home appliance or an IoT appliance (internet of things).

The predetermined time interval amounts to in particular a maximum of 15 minutes, however it can be shorter.

In accordance with one embodiment of the arrangement, the application or the household appliance is additionally configured so as to place the household appliance into an energy saving mode after the termination of the communications connection and in said energy saving mode an energy consumption of the household appliance is below a predetermined upper limit.

The predetermined upper limit lies in particular at 2 W, however it can also lie below this.

In accordance with a further embodiment of the arrangement, the external operating facility comprises an image capturing facility for capturing an image of a surrounding area of the external operating facility, wherein the application of the external operating facility is configured so as to detect in dependence upon the detected image an eye contact of the user with the application of the external operating facility and in dependence upon the detected eye contact to detect the interaction of the user with the application of the external operating facility.

In this embodiment, advantageously an eye contact of the user with the application of the external operating facility is detected as an interaction of the user with the application. For example, it is possible for this purpose to use image processing that renders possible eye recognition or pupil recognition.

In accordance with a further embodiment of the arrangement, the application of the external operating facility is configured so as to wake the household appliance from the energy saving mode and to place said household appliance into a data query mode in which exclusively the components of the household appliance that are required for the transmission and/or receiving of data by the application are activated.

The components that are required include for example a modem and a storage unit and current state and/or operating data of the household appliance is stored in said storage unit. Further components, such as for example a display apparatus or a control apparatus of the household appliance, are switched off in the data query mode and therefore do not consume energy.

In the case of household appliances that also then require a relatively large amount of energy, if the user is not currently using this appliance, such as for example in the case of a fridge, the term "energy saving mode" is understood to mean an operating mode in which the household appliance fulfils the basic function, in other words for example cooling, however components that are not required for this are switched off. The respective basic function in this case also remains active after the placement into the data query mode with the result that this basic function is always ensured.

Further possible implementations of the invention also comprise combinations, which are not explicitly mentioned, of features or embodiments that are described above or below in relation to the exemplary embodiments. In this case, the person skilled in the art will also add individual aspects as improvements or additions to the respective basic form of the invention.

BRIEF DESCRIPTION OF THE DRAWINGS

Further advantageous embodiments and aspects of the invention are the subject matter of the dependent claims and also the exemplary embodiments of the invention that are described below. Hereafter, the invention is further explained with the aid of preferred embodiments with reference to the attached figures.

DETAILED DESCRIPTION OF EXEMPLARY EMBODIMENTS OF THE PRESENT INVENTION

Figure 1:
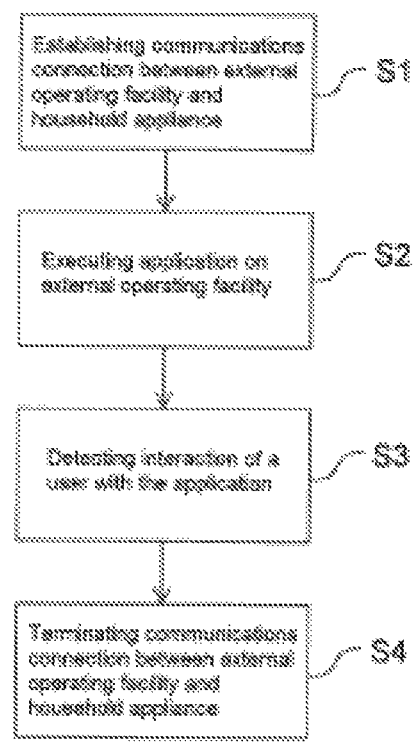
FIG. 1 shows a schematic block diagram of an exemplary method for operating a household appliance.

In the figures, identical or functionally identical elements are provided with the same reference numerals provided that nothing different is stated.

Figure 2:
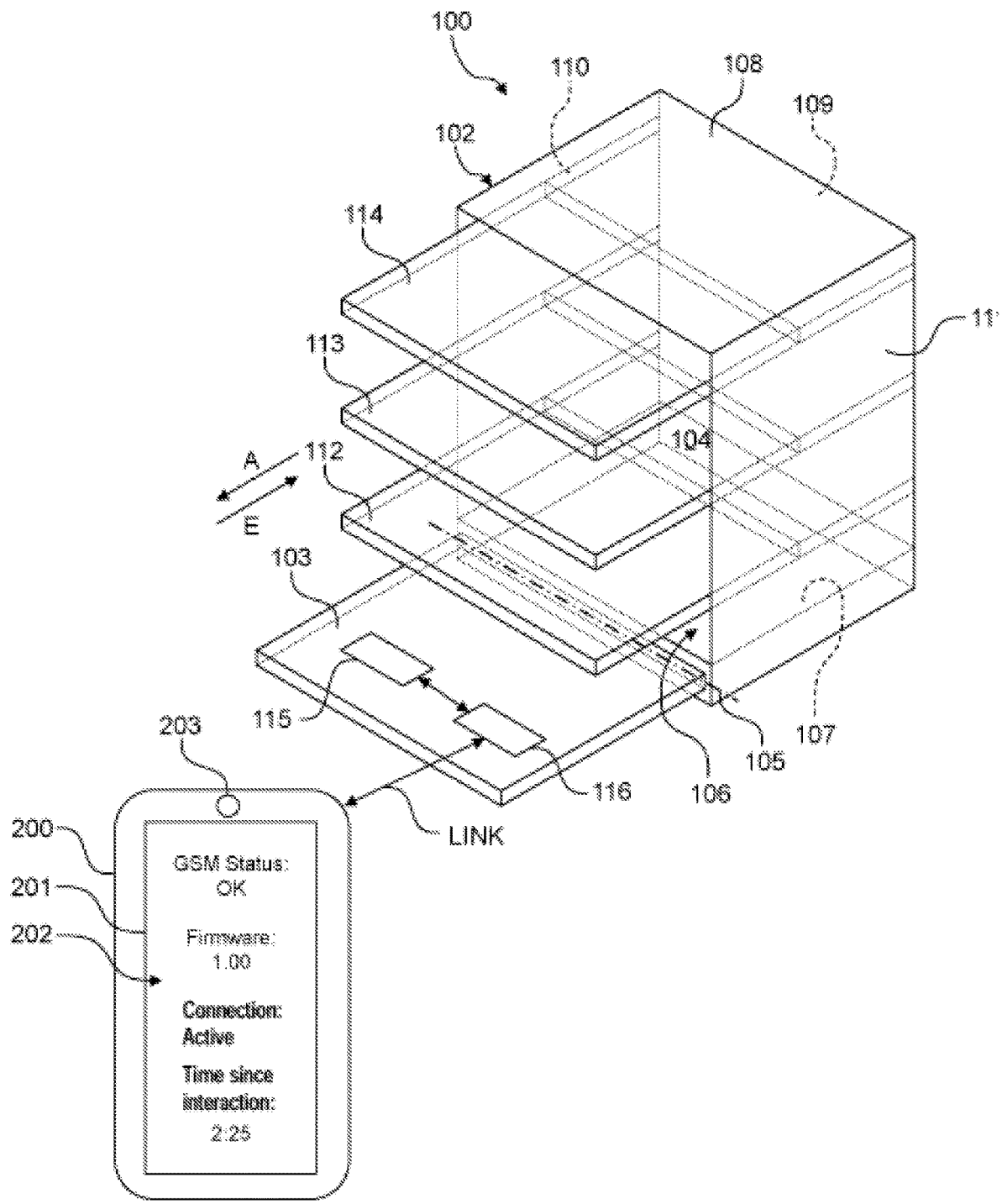
FIG. 2 shows an arrangement comprising a household appliance and an external operating facility.
Figure 3:
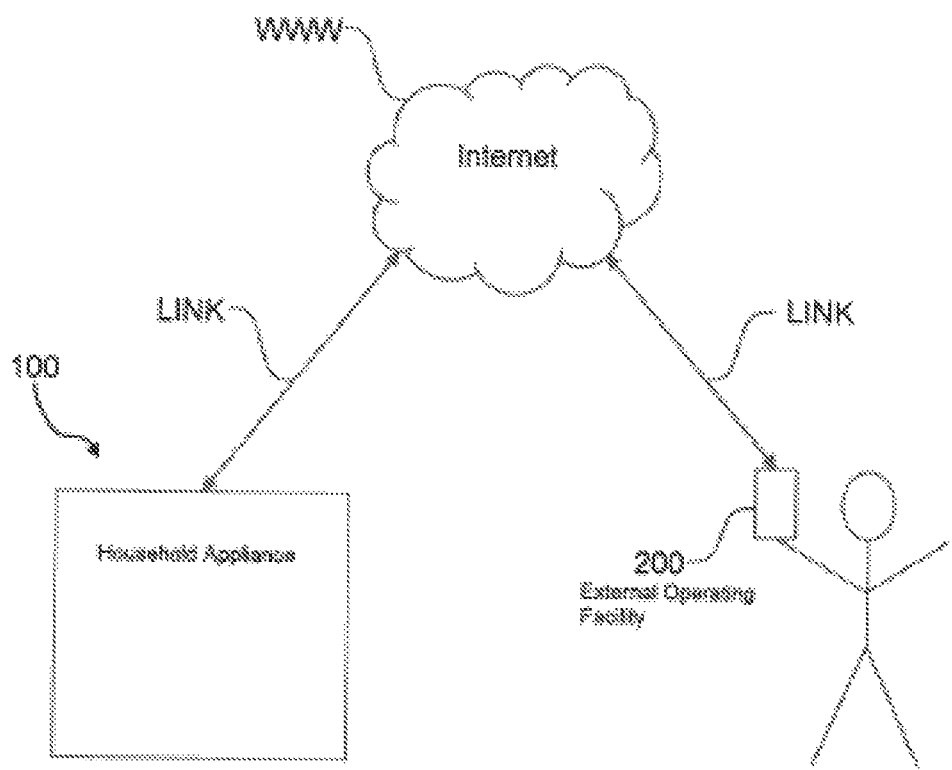
FIG. 3 shows a further arrangement comprising a household appliance and an external operating facility.

FIG. 1 illustrates a schematic block diagram of an exemplary method for operating a household appliance 100 (cf. FIG. 2 or 3). The household appliance 100 can be coupled to the external operating facility 200 (cf. FIG. 2 or 3) by means of a communications connection LINK (cf. FIG. 2 or 3).

In a first step S1, the communications connection LINK is produced between the external operating facility 200 and the household appliance 100. The communications connection LINK is produced for example by means of Wi-Fi, Bluetooth®, mobile communications or the like, wherein the communications connection can be produced via exchanges, such as a router or a server.

In a second step S2, an application 202 (cf. FIG. 2 or 3) is executed on the external operating facility 200 that is configured so as to receive data from and/or to transmit data to the household appliance 100 by means of the communications connection LINK.

It is to be noted that the order of the steps S1 and S2 can also be exchanged, in particular if the application 202 triggers the production of the communications connection LINK.

In a third step S3, an interaction of a user with the application 202 of the external operating facility 200 is detected. For example, the external operating facility 200 is provided as a mobile telephone and is held by the user in the hand, which is detected by means of an acceleration sensor and which is detected as an interaction of the user with the application 202. It is preferred that an eye contact of the user with the application 202 is detected as the interaction, wherein for this purpose for example a camera is provided.

In a fourth step S4, the communications connection LINK between the external operating facility 200 and the household appliance 100 is terminated in dependence upon an expiration of a predetermined time interval since a last detected interaction of the user with the application 202 of the external operating facility 200. It is preferred that the household appliance 100 is simultaneously placed into an energy saving mode if this is possible at the respective point in time.

FIG. 2 illustrates a schematic perspective view of a household appliance 100, which is provided as a household dishwasher, in an arrangement with an external operating facility 200. The external operating facility 200 in this case is provided as a mobile telephone. The mobile telephone 200 comprises a touch sensitive display apparatus 201 and a camera 203 that is configured so as to capture an image. An application 202 is executed on the mobile telephone 200, and said application is configured so as to monitor and preferably also to control the household dishwasher 100. For this purpose, a communications connection LINK with the communications facility 116 of the household dishwasher 100 is produced by the application 202 by means of an antenna (not illustrated) of the mobile telephone 200. For example, status data and configuration data are transmitted via the communications connection LINK. In the present case in an exemplary manner four items of information are displayed on the display apparatus 201 by the application 202. This illustration is not to be understood as limiting, in other words it is neither necessary for the application 202 to display the illustrated information nor is the application to be limited to this information. On the contrary, the application 202 can be configured so as to display a plurality of different information and/or images by means of the display apparatus 201.

The household dishwasher 100 comprises a dishwasher cavity 102 that can be closed, in particular in a watertight manner, by a door 103. For this purpose, a sealing facility can be provided between the door 103 and the dishwasher cavity 102. The dishwasher cavity 102 is preferably cuboid. The dishwasher cavity 102 can be arranged in a housing of the household dishwasher 100. The dishwasher cavity 102 and the door 103 can form a dishwasher interior 104 for washing items that are to be washed.

The door 103 is illustrated in FIG. 2 in its opened position. The door 103 can be closed or opened by pivoting about a pivot axis 105 that is provided on a lower end of the door 103. With the aid of the door 103, it is possible to close or open a loading hatch 106 of the dishwasher cavity 102. The dishwasher cavity 102 has a base 107, a ceiling 108 that lies opposite the base 107, a rear wall 109 that is arranged lying opposite the closed door 103 and two side walls 110, 111 that are arranged lying opposite one another. The base 107, the ceiling 108, the rear wall 109 and the side walls 110, 111 can be produced for example from a stainless steel sheet. Alternatively, for example the base 107 can be produced from a plastic material.

The household dishwasher 100 moreover has at least one receptacle 112 to 114 for items to be washed. It is preferred that multiple, for example three, receptacles 112 to 114 for items to be washed can be provided, wherein the receptacle 112 for items to be washed can be a lower receptable for items to be washed or a lower basket, the receptacle 113 for items to be washed can be an upper receptacle for items to be washed or an upper basket and the receptacle 114 for items to be washed can be a cutlery drawer. As FIG. 2 furthermore illustrates, the receptacles 112 to 114 for items to be washed are arranged one above the other in the dishwasher cavity 102. Each receptacle 112 to 114 for items to be washed can be selectively shifted into the dishwasher cavity 102 or out of said dishwasher cavity. In particular, each receptacle 112 to 114 for items to be washed can be slid in or pushed into the dishwasher cavity 102 in a direction of insertion E and can be pulled out or slid out of the dishwasher cavity 102 opposite the direction of insertion E in a direction of extraction A.

The household dishwasher 100 moreover has a control apparatus 115 that is configured so as to implement a washing program from a plurality of washing programs. It is possible by means of the communications facility 116 for a user to exchange data with the control apparatus 115. For this purpose, it is preferred that the application 202 is used, wherein the data is transmitted via the communications connection LINK. The application 202 of the mobile telephone 200 is configured so as to terminate the communications connection LINK if a predetermined time interval since the last detected interaction of the user has expired. If the household dishwasher 100 at the point in time is not currently fulfilling another function, for example a washing program, then the household dishwasher 100 is preferably simultaneously placed into an energy saving mode.

For example, the user monitors the current consumption values of the household dishwasher 100 by means of the application 202. For this purpose, the user places the mobile telephone 200 in front of themselves on a table. At the same time they read the newspaper, wherein they regularly look at the development of the consumption values that are displayed in the application 202. The camera 203 of the mobile telephone 202 detects the viewing direction of the user and identifies therefore if the user is looking at the display apparatus 201 of the mobile telephone 200. This is detected as an interaction of the user with the application 202. The communications connection LINK consequently remains active and the household dishwasher 100 is not placed into the energy saving mode. If the user leaves the mobile telephone 200 on the table after some time for example and performs another activity without further monitoring the consumption values, but the application 202 is furthermore executed, then the camera 203 will not determine an eye contact of the user with the application 202. If the predetermined time interval, which in this case is 15 minutes, has expired without an interaction of the user with the application 202 being detected, the application 202 terminates the communications connection LINK and simultaneously transmits a command to the household dishwasher 100 to transfer if possible into the energy saving mode.

FIG. 3 illustrates a schematic block diagram of an arrangement of a household appliance 100, which in this case is provided as a fridge, and an external operating facility 200, which in this case is provided as a mobile telephone. The user of the mobile telephone 200 holds this mobile telephone in their hand and is for example currently shopping. In order to learn what is missing in the fridge 100, the user starts an application 202 (cf. FIG. 2) on the mobile telephone 200 that produces a communications connection LINK to the fridge 100 via the internet WWW. For this purpose, the fridge 100 is placed for example from a resting mode into a data transmitting mode. The resting mode in the case of the fridge 100 is for example an operating mode in which it is ensured that an interior temperature in the fridge 100 is within a predetermined interval, such as for example between 2° C.-6° C. In this case, in particular a cooling facility (not illustrated) can be at least temporarily activated. In the data transmitting mode, the fridge 100 can transmit current state data to the application 202, in the present case for example an image of the fridge interior, which was captured after the last closing of a fridge door. Other components of the fridge 100 however remain inactive, which saves energy (the cooling facility can be exempted from this in order to ensure a constant fridge interior temperature). After the application 202 has received the image, the application displays the image on the display apparatus 201. After the user has taken the image into consideration, the user can for example return to shopping. If the user terminates the application 202 the communications connection LINK to the fridge 100 is also terminated and the fridge 100 is again placed in the rest mode. If the user forgets to terminate the application 202 but no longer interacts with this application, then after the expiration of the predetermined time interval the communications connection LINK to the fridge 100 is automatically terminated and the fridge 100 is again placed into the rest mode. It is thereby ensured that the fridge 100 does not consume energy unnecessarily.

Although the present invention has been described with the aid of exemplary embodiments, the invention can be modified in diverse ways.

The invention claimed is:

1. A method for operating a water-conducting household appliance, said method comprising:
    establishing a communications connection between an external operating facility and the water-conducting household appliance;
    executing on the external operating facility an application that is configured so as to receive data from and to transmit data to the water-conducting household appliance via the communications connection;
    detecting an interaction of a user with the application of the external operating facility, wherein the interaction of the user with the application of the external operating facility comprises a detection of a movement of the external operating facility or a detection of a noise in a proximity of the external operating facility;
    terminating the communications connection between the external operating facility and the water-conducting household appliance in dependence upon an expiration of a predetermined time interval since a last detected interaction of the user with the application of the external operating facility;
    determining that the water-conducting household appliance is not executing an active operating program at a point in time corresponding to the expiration of the predetermined time interval; and
    in response to determining that the water-conducting household appliance is not executing the active operating program and substantially contemporaneous to the expiration of the predetermined time interval since the last detected interaction of the user with the application of the external operating facility, placing the water-conducting household appliance into an energy saving mode in which an energy consumption of the water-conducting household appliance is below a predetermined upper limit and in which at least one component of the water-conducting household appliance used in transmitting or receiving data to or from the application on the external operating facility is switched off.

2. The method of claim 1, wherein the water-conducting household appliance is placed into the energy saving mode in dependence upon a command that is transmitted by the application of the external operating facility to the water-conducting household appliance.

3. The method of claim 1, wherein the energy consumption of the water-conducting household appliance in the energy saving mode is at most 2 Watts.

4. The method of claim 1, wherein detection of the interaction of the user with the application on the external operating facility comprises a detection of eye contact of the user with the application on the external operating facility.

5. The method of claim 1, wherein the predetermined time interval comprises at most 15 minutes.

6. The method of claim 1, further comprising:
waking the water-conducting household appliance from the energy saving mode so as to establish the communications connection; and
placing the water-conducting household appliance into a data query mode in which the at least one component of the water-conducting household appliance used in transmitting or receiving the data to or from the application on the external operating facility is activated.

7. The method of claim 1, further comprising transmitting a push notification from the water-conducting household appliance to the application on the external operating facility.

8. The method of claim 7, wherein the push notification is periodically transmitted or is transmitted in the case of a change in state of the water-conducting household appliance.

9. A non-transitory computer program product with commands that execute a method set forth in claim 1 when the commands are executed on a computer.

10. An arrangement, comprising:
a water-conducting household appliance;
an external operating facility;
a communications connection configured to couple the water-conducting household appliance and the external operating facility; and
an application executable on the external operating facility and configured to receive data from and to transmit data to the water-conducting household appliance via the communications connection, to detect during execution of the application on the external operating facility an interaction of a user with the application, wherein the interaction of the user with the application of the external operating facility comprises a detection of a movement of the external operating facility or a detection of a noise in a proximity of the external operating facility; to terminate the communications connection between the external operating facility and the water-conducting household appliance in dependence upon an expiration of a predetermined time interval since a last detected interaction of the user with the application on the external operating facility, to determine that the water-conducting household appliance is not executing an active operating program at a point in time corresponding to the expiration of the predetermined time interval, and to, in response to determining that the water-conducting household appliance in not executing the active operating program and substantially contemporaneous to the expiration of the predetermined time interval since the last detected interaction of the user with the application of the external operating facility, place the water-conducting household appliance into an energy saving mode in which an energy consumption of the water-conducting household appliance is below a predetermined upper limit and in which at least one component of the water-conducting household appliance used in transmitting or receiving data to or from the application on the external operating facility is switched off.

11. The arrangement of claim 10, wherein the external operating facility comprises an image capturing facility for capturing an image of a surrounding area of the external operating facility, said application being configured to detect in dependence upon the captured image an eye contact of the user with the application on the external operating facility and in dependence upon the detected eye contact to detect the interaction of the user with the application on the external operating facility.

12. The arrangement of claim 10, wherein the application on the external operating facility is configured to wake the water-conducting household appliance from the energy saving mode and to place the water-conducting household appliance into a data query mode in which the at least one component of the household appliance used in transmitting or receiving the data to or from the application is activated.

* * * * *